United States Patent [19]

Emplit et al.

[11] Patent Number: 4,819,483
[45] Date of Patent: Apr. 11, 1989

[54] LEVEL INDICATOR CONTROL SYSTEM FOR USE WITH CAPACITANCE PROBES IN TANKS CONTAINING SUBSTANCES

[75] Inventors: Raymond H. Emplit, Glen Mills; Donald Y. Daily, Havertown, both of Pa.

[73] Assignee: Custom Controls Co., Inc., Broomall, Pa.

[21] Appl. No.: 219,864

[22] Filed: Jul. 12, 1988

Related U.S. Application Data

[63] Continuation of Ser. No. 31,166, Mar. 26, 1987, abandoned, which is a continuation of Ser. No. 851,319, Apr. 9, 1986, abandoned, which is a continuation of Ser. No. 755,541, Jul. 15, 1985, abandoned, which is a continuation of Ser. No. 585,025, Mar. 5, 1984, abandoned, which is a continuation of Ser. No. 330,065, Dec. 15, 1981, abandoned.

[51] Int. Cl.⁴ .............................................. G01F 23/00
[52] U.S. Cl. ................................. 73/304 C; 364/509
[58] Field of Search ............... 73/1 H, 304 R, 304 C; 137/392; 324/61 R, 61 P; 340/620; 361/284; 364/509

[56] References Cited

U.S. PATENT DOCUMENTS

| | | | |
|---|---|---|---|
| 3,375,716 | 4/1968 | Hersch | 73/304 C |
| 3,747,407 | 7/1973 | Wallman | 324/61 R |
| 3,916,213 | 10/1975 | Luteran | 73/304 C |
| 4,083,248 | 4/1978 | Maier | 73/304 C |
| 4,199,984 | 4/1980 | Huddart | 73/304 C |
| 4,228,427 | 10/1980 | Niedermeyer | 73/308 |
| 4,383,444 | 5/1983 | Beaman | 73/1 H |
| 4,386,406 | 5/1983 | Igarashi | 73/1 H |
| 4,441,157 | 4/1984 | Gerchman | 73/1 H |
| 4,449,405 | 5/1984 | Franz et al. | 73/304 C |
| 4,590,575 | 5/1986 | Emplit | 364/509 |

Primary Examiner—Allan N. Shoap
Assistant Examiner—W. Morris Worth
Attorney, Agent, or Firm—Ratner & Prestia

[57] ABSTRACT

A level indicator control system including a microprocessor that controls the height and, therefore, the amount of the substance, such as fluid or granular solid, to be contained in a closed or open tank or vessel. The system provides calibrated digital or analog output that shows the extent to which the tank is filled with substance at substantially any level. A scale, in percent, each value representing the percentage of fullness of the tank, is produced after low and high limits, representing any low and high substance levels respectively, are provided to the microprocessor. The scale values are a function of the changes in capacitance between the stationary probe and the tank wall as the level of substance approaches or submerges the probe. The system finds its probe capacitance and sets its own high and low control set point limits automatically. Thereafter, the system uses the instantaneous probe capacitance and the capacitance values representing the high and low substance levels to provide the calibrated digital or analog output. For example, when the substance in the tank exceeds the high limit set point value, the control system prevents more fluid or granula solid from entering the tank.

7 Claims, 3 Drawing Sheets

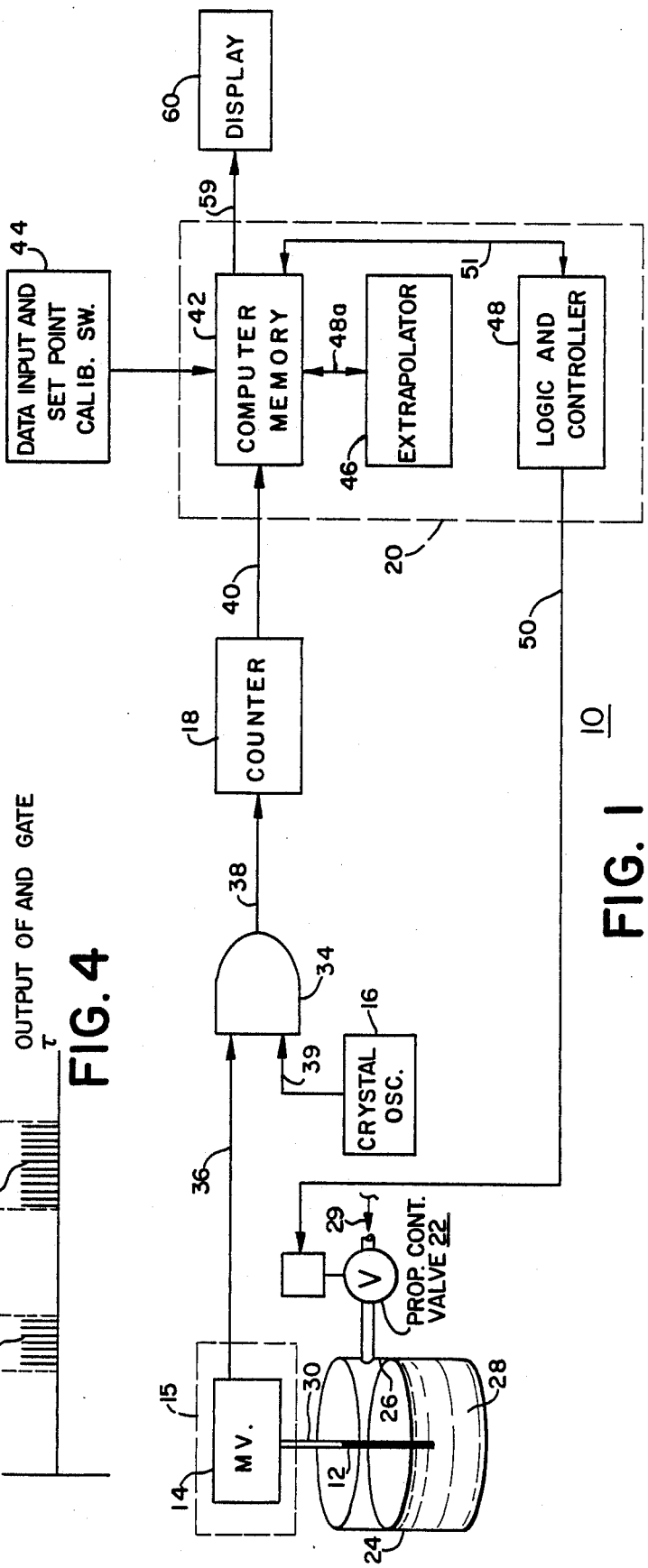
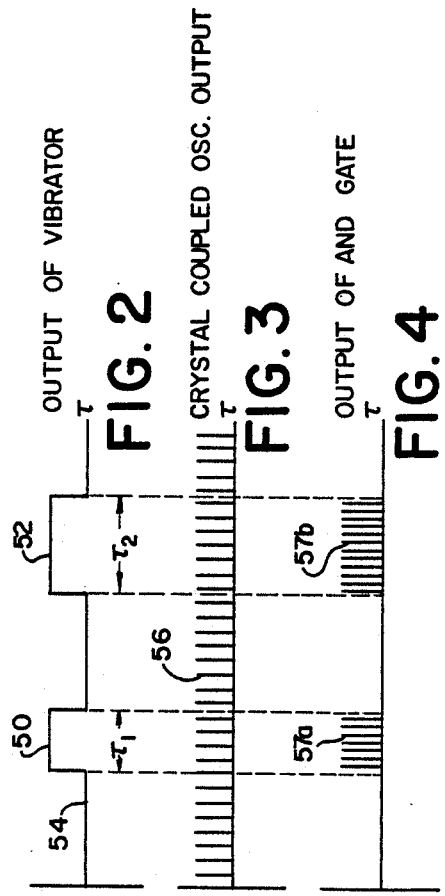
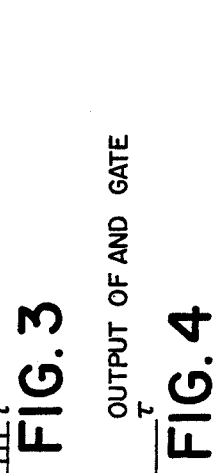

LEVEL INDICATOR CONTROL SYSTEM FOR USE WITH CAPACITANCE PROBES IN TANKS CONTAINING SUBSTANCES

This application is a continuation of Ser. No. 06/031,166 filed Mar. 26, 1987 now abandoned which is a continuation of 06/851,319 filed Apr. 9, 1986 now abandoned which is a continuation of application Ser. No. 755,541 filed July 15, 1985, now abandoned, which is a continuation of application Ser. No. 585,025 filed Mar. 5, 1984, now abandoned, which is a continuation of application Ser. No. 330,065 filed Dec. 15, 1981, now abandoned.

BACKGROUND OF THE INVENTION

A. Field of the Invention

This invention relates to the field of art of level indicator control systems using capacitive probes for indication and control of a substance in a tank.

B. Background Art

It is well known that the level of a substance, i.e. a fluid or granular solid, in an open or closed tank or vessel can be measured and controlled by many, fundamentally similar, methods. Measurement and control is usually based on the concept that the change in fluid level in the tank is equivalent to displacing the top surface of the fluid.

In an earlier method of measurement and control, floats were used to detect and regulate the fluid level in a container. The method employs direct-actuated types of liquid level detectors and is applicable to open tanks or vessels which are subject to atmospheric pressure. However, when using closed tanks, water level is detected in a system under pressure. An arrangement used for this purpose includes one valve positioned at the lowest fluid level point in the tank. Periodic opening of these valves will establish the presence of either steam or water at each valve permitting an inference to be drawn concerning the actual water level in the tank.

Later detectors measured the fluid level in a tank by sensing the hydrostatic head of the fluid and converting this pressure measurement to actual fluid level height or fluid volume. For open tanks, a pressure-gauge-type instrument may be used. A connection is made to the pressure gauge at the minimum or zero fluid level. The full scale range of the gauge is made equal to the head of the fluid in the tank. There are numerous variations of this method including adaptations to tanks where the pressure gauge cannot be located at the zero level and where the medium to be measured is a solid.

A pressure gauge is not practical for measuring fluid level in a pressurized tank, since the actual level to be measured represents only a very small equivalent percentage of the static pressure of the fluid in the tank. Also, an added difficulty is that unless the tank pressure is held constant, the pressure gauge reading is of no value since the change in pressure alters the initial zero level reading. To overcome these problems, differential pressure measuring devices were used to measure the fluid level in pressurized tanks. Connections are made at both high and low fluid levels, one to each side of the differential pressure device, i.e. a Bellows-type meter. The separate connection to each side of the differential pressure device provides for a balancing of the effect of static pressure since it exerts the same force on both the high-pressure and low-pressure side of the tank. Therefore, the pressure head which actuates the detector is the difference between the constant reference and variable fluid level in the tank.

Other devices, improvements and adaptations of float-operated level sensors were developed based on the principles previously discussed. For example, a float may be connected to an electrical switch for providing an alarm, operating a solenoid valve or indicating when a discrete amount of fluid has been poured in or removed from the tank. Floats may be used to operate control valves directly to prevent further fluid flow to the tank, and displacement-type float units may be used to operate control units and remote transmitters.

Another method for detecting fluid levels in tanks utilizes the concept that certain fluids will conduct electricity, while air in a relative sense does not, so that the fluid level may be established through the physical contact of the probe and the conductive fluid. Since the change in fluid level is equivalent to displacing the top surface of the fluid, the usually linear displacement may be measured by resistive, capacitive, magnetic, or photoelectric transducers. Further methods of level detection include temperature-sensing transducers, multi-turn potentiometers operated by a float actuated cable and ultrasonic and gamma-ray adsorption.

A computer-based control system uses well known signal acquisition input instrumentation to obtain analog signals from sensors and transducers, such as capacitance probes, in the tank and transmits them to the computer. To close the fluid level control loop, D/A converters and digital output channels may be used to transmit the signals used to drive on-off fluid level controllers and actuators. Devices such as relays or stepper motors for opening and closing pneumatic fluid valves are also provided control signals from the computer along digital output channels for controlling the fluid flow into and out of the tank. The processor may, for example, compare the input signals from the fluid level transducers with upper and lower set point limits in order to control, in on-off, proportional, integral or differential modes, the fluid flow to the tank to maintain the desired liquid level within a predetermined range. Alarm monitoring and faulty transducer detection can also be performed by the computer.

Analog controllers may be used without a computer processor for controlling the level of fluid in a tank. The analog controller may either use its own set point reference voltage to control fluid input to the tank or it may accept fluid level set point limits from a central processor for the same purpose.

Output devices such as strip chart recorders using properly scaled paper, calibrated meters with d'Arsonval movement and digital displays have all been used to show the amount and the height of fluid in tanks.

SUMMARY OF THE INVENTION

An on-line level indicator control system is used for automatically calibrating high and low set point levels of substances such as fluids or solids in shaped containers. A transmitter produces a present level signal that is proportional to the capacitance between a probe positioned within a container and the container. Logic means produces a time interval signal that is a function of the duration of the present level signal and represents the present level of the substance in the container. Calibration switches provide the memory with calibrated set points representing the percent of fullness of the container at predetermined low and high fluid or solid levels as a function of the time interval signal. An extrapolator receives the high and low set points and the present level signal for providing an indication of the present level within a calibrated range of fluid or solid levels for the container as measured from the bottom to the top of the container. A fail-safe mode controls the filling or draining of the container when a short or open is detected.

Therefore, it is an object of this invention to provide on-line substantially automatic calibration of high and low fluid level set points as a function of probe capacitance each corresponding to a percentage of the tank that contains fluid at any two identified high and low levels substantially within the range from the bottom to the top of the tank.

It is another object of this invention to use the arbitrarily selected high and low fluid level set points to produce a scale that includes substantially all of the possible levels of fluid that could be in the tank in terms of percent of tank filled as the actual fluid height is monitored through the operation of the level indicator control system.

It is a further object of this invention to provide, simultaneously, the actual level and amount(volume) of fluid in the tank during the course of operation of the level indicator control system.

It is an additional object of this invention to avoid recalibration of the high/low set point levels during level control operation using the same tank.

It is another object of this invention to eliminate adjustments to the probe transmitter while in operation in the field.

Still another object of this invention is to provide a fail-safe mode when the line between the probe transmitter and the control system opens or shorts.

BRIEF DESCRIPTION OF THE DRAWINGS

FIG. 1 is a circuit diagram of the on-line level indicator control system of the invention;

FIG. 2 shows the output waveform of the multivibrator illustrated in FIG. 1.

FIG. 3 shows the output pulses of the crystal coupled oscillator illustrated in FIG. 1.

FIG. 4 shows the output signals of the AND gate illustrated in FIG. 1.

DESCRIPTION OF THE PREFERRED EMBODIMENT

Figure 5A:
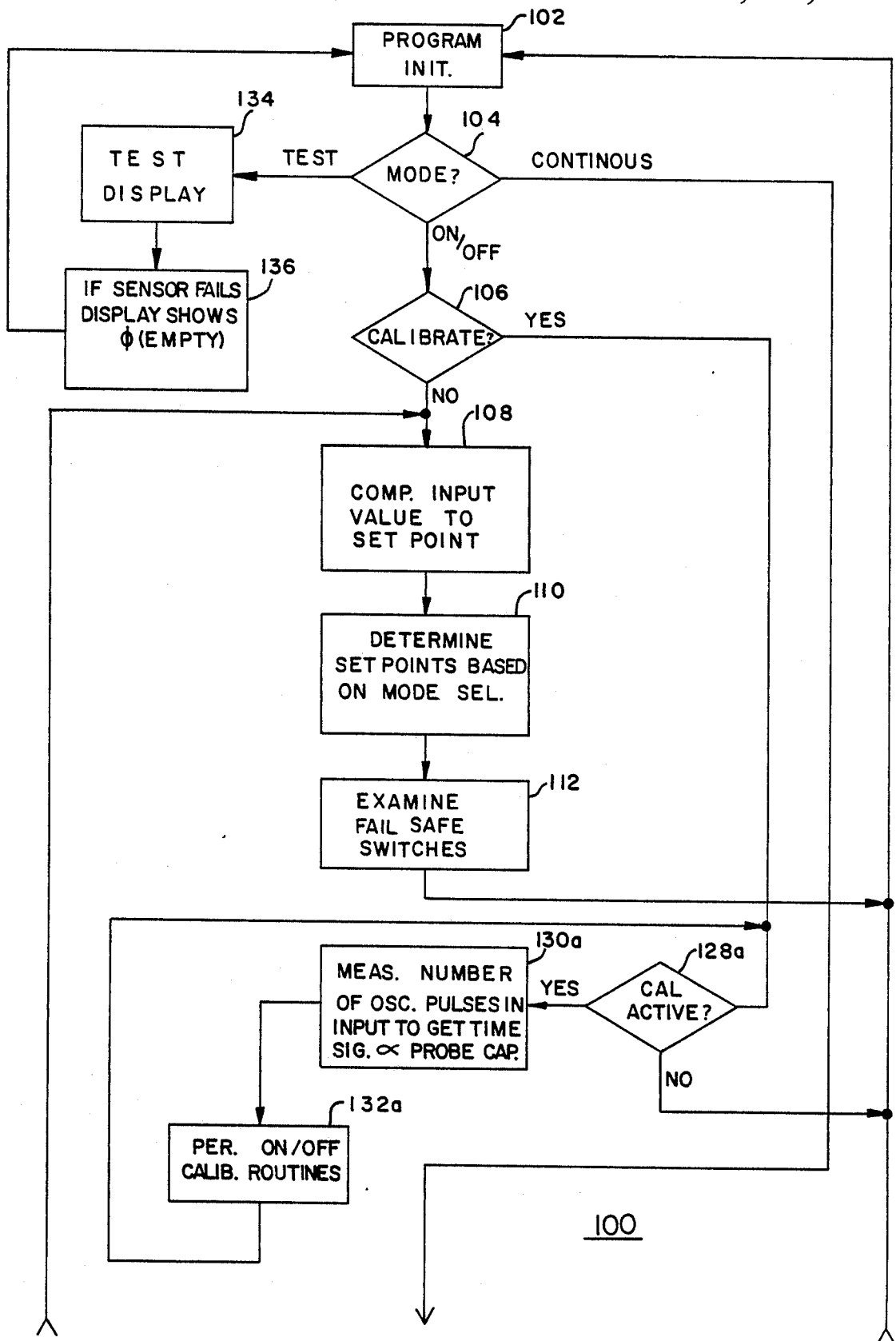
FIGS. 5A-B illustrates a flow chart of the computer program that detects when the system shown in FIG. 1 is in a fail-safe mode.

As shown in FIG. 1 level indicator control system 10 includes capacitance probe 12, transmitter 15, crystal coupled oscillator 16, AND gate 34, counter 18, a control system comprising microprocessor 20, manual data input and set point calibration switches 44 and flow control circuit 22.

Probe 12 is positioned within a shaped container such as tank 24. The probe, which may be substantially in the shape of a cylinder or plate, forms a capacitor with tank wall 26. As the substance 28, i.e., fluid or granular solid, fills tank 24, the capacitance between probe 12 and wall 26 changes since the varying amount of substance alters the dielectric properties of the space between one capacitor element, the probe, and the second capacitor element, the tank wall. Over time, the amount of substance that is initially in the tank will not remain constant and, therefore, the capacitance between the probe and the wall, the probe capacitance, will vary as the level of substance in the tank varies. Probe 12 produces an input signal along line 30 to transmitter 15 which is a function of the change in probe capacitance. Probe capacitance is a function of the amount of probe submerged by the substance or the distance between a plate type probe and the surface of the substance below it. Transmitter 15 includes multivibrator 14 which changes its output frequency as a function of the change in probe capacitance provided along line 30. The transmitter may be mounted in the head of the probe.

Referring now to FIG. 2, the signal transmitted from probe 12 to multivibrator 14 controls the width of multivibrator output signal 54 along line 36. Specifically, the width of waveform 50 of signal 54 is a function of the probe capacitance. As the capacitance increases the output of multivibrator 14 produces waveform 52 which is wider than waveform 50 as shown in FIG. 2. Output signal 54 of multivibrator 14 is applied to logical AND gate 34 along line 36. Crystal coupled oscillator 16 provides a continuous series of pulses 56 as shown in FIG. 3 to AND gate 34 along line 39. The output of AND gate 34 is provided along line 38 to counter 18 where only those oscillator pulses, 57a, 57b, that occurred within the width of waveform 50 and 52 respectively, are counted to provide a time interval signal representing each of the widths of the waveforms of multivibrator output signal 54. The number of oscillator pulses, 57a, 57b, counted within the width of each multivibrator output waveform 50 and 52, as shown in FIG. 4, is a function of the probe capacitance that substantially produced each waveform. This capacitance of probe 12 is a function of the change in dielectric properties of the substance 28 between probe and tank wall which is also a function of the amount of substance in the tank or the level of the substance in the tank. The oscillator, AND gate and counter form a logic means for providing a time interval signal to memory 42 in microprocessor 20.

In this embodiment, the time interval signal, which is a function of the duration or width of each output waveform of the multivibrator, is calibrated to represent the percentage of the tank that contains fluid. Specifically, an output signal waveform has a time interval, $\tau_1$, that is proportional to the probe capacitance and represents, for this example, that 35% of the tank is filled with the fluid or granular solid. Another, longer waveform time interval, $\tau_2$, may indicate that the tank is 45% filled. Furthermore, since each time interval signal represents the percentage of the tank that contains fluid and since the contents of the tank will be filling and emptying due to the conditions imposed on its use, it becomes important to know, in certain situations, how high the fluid level is at any given moment in terms of the percentage of the tank that contains fluid as well as whether the fluid has exceeded a particular level or not. To accomplish this task, two known time interval signals are provided, one that represents the point at which the tank is substantially filled with fluid, a high set point limit, and one that represents the point at which the tank is substantially empty of fluid, a low set point limit. A scale of percentages about these two limits is produced where the scale is calibrated to represent the percent fullness of the tank at any given time about the limits set by the two high and low set points. Each scale has elements that represent the fullness of the container as measured from the bottom of the container to a point on the container identified by a scale element. The method and device for measuring the unknown level of fluid in a tank, for controlling the amount of fluid in the tank and for providing a scale that is calibrated in terms of percent of tank filled and where each value of the scale is a function of the probe capacitance is as follows.

Probe 12 may be installed in an angular position suitable for the size and shape of any tank. Probes installed from the side of the tank should be angled downward to allow the fluid or granular solid to drain or slide off the probe. An adjustable time delay may be included to eliminate spurious operation of system 10 due to splashing or agitation of the fluid in the tank. In FIG. 1, probe 12 is positioned vertically in cylindrically shaped tank 24. Changing the level condition of substance 28 of tank 24 will change the capacitance between the probe and the tank wall. Since this capacitance is transmitted to multivibrator 14 by way of a signal along line 30 and since the frequency with which the multivibrator jumps between positive and negative voltage states is controlled by the capacitance signal transmitted to it, the shape of output signal 54 from multivibrator 14 will vary as a function of the probe capacitance.

Crystal coupled oscillator 16 provides clock pulses along line 39 to gate 34. The multivibrator output signal waveforms are also provided as input to gate 34 along line 36. Gate 34 produces, by logical conjunction of the clock pulses with the multivibrator output waveforms, gated output signals along line 38 which are provided to counter 18. Counter 18 produces signals that substantially represent the width of each of the waveforms produced by the multivibrator. The digital signals produced by the counter are provided to a predetermined location in microprocessor memory 42 along line 40. The counter output may represent a desired low or high fluid or substance level set point signal, representing the percentage of the tank that contains fluid at substantially that moment, which is to remain in memory indefinitely. Manual data input and set point calibration switches 44 are provided for the purpose of entering relative input parameters and storing the low and high fluid or substance level signals in memory 42 of microprocessor 20. The calibration switches provide for fluid level signals to be stored in memory that represent the operation measurement of substantially any liquid level in the tank in terms of percent of fullness of the tank on a scale of from 0% to 100%. Non-linear conversion of the level signals to units of volume or flow rate in open channel flow systems may be obtained through suitable, well-known microprocessor based linearizing means regardless of the shape of the tank. The low fluid or substance level set point signal may not necessarily represent the fluid level in the tank when it is completely empty and the high fluid level signal may not necessarily represent the fluid or substance level in the tank when it is completely full. The set points are automatically calibrated in terms of the percent of fluid in tank 28. The high and low set points in memory 42 are provided to extrapolator 46 along data lines 48a. Extrapolator 46 uses both the high level set point, which may represent the tank fluid level other than at 100% full, and low level set point, which may represent the tank fluid level at a point other than when the tank is empty. Extrapolator 46 will then establish the proper range of percentages of fullness of the tank in the range between empty (0%) and full (100%) after operating on the two low and high set points obtained from memory 42. In this example of a fluid tank with a high set point other than 100% and a low set point other than 0%, control means 20 accomplishes extrapolation to produce the percent fullness in the range between 0% and the low set point, in the range between the high set point and 100%, as well as the range between the set points.

Extrapolator 46 in microprocessor 20 not only produces a scale having the range of fluid levels in the tank in terms of the percentage of fullness of the tank but may also use the instantaneous digital signals provided by the counter 18 as stored in the memory 42 and the counter values and the corresponding manually entered percentages for the respective high and low set points to provide the volume of fluid in the tank at virtually any moment during its use. The method of determining the present substance level, Z, is given by the equation (1).

$$Z = X + [(Y-X)*((C-A)/CB-A))] \quad (1)$$

Where the "*" indicates the multiplication operator and the values represented by the variables A,B,C,X and Y are given in the following table.

TABLE

| | Time Interval Signals | Substance Levels (in terms of percent of fullness) |
|---|---|---|
| Low Set Point | A | X |
| High Set Point | B | Y |
| Present Level | C | Z |

Fluid flow rate may also be determined in open channel systems. Extrapolator 46 may, by way of a table look-up feature, determine fluid levels in oddly shaped containers and compensate for non-linearities of probe configurations due to tanks of different geometries.

System 10 provides a level control mode of operation by comparing in logic and controller section 48 the actual fluid level or volume in the tank with either the higher or lower set point values provided to the section along line 51 from memory 42. For example, if overfilling of a tank is to be avoided and the actual fluid level exceeds the high limit set point in memory 42, then a signal is provided from controller 48 along line 50 to proportional control valve 22, which may also include a stepper motor or a similarly functioning device, to stop the flow of fluid through line 29 into tank 28. Control relays may also be used to control fluid flow into and out of the tank. If, on the other hand, an empty condition cannot be tolerated and the actual fluid level is below low limit set point in memory 42, a signal is provided along line 50 to proportional control valve 22 to allow more fluid to flow into tank.

System 10 also provides a fail-safe mode of operation which provides a desired output, on display 60 for example, in the event of a system failure such as a power or equipment failure. In this case, the fail-safe mode becomes operable when the circuit shorts or opens along line 36. In a high fail-safe mode a high level (unsafe) condition will be simulated for the system. In the low fail-safe mode, the situation is reversed. In the case of a short or open circuit, the low fail-safe mode is implemented. If overfilling of the tank is to be avoided, the high fail-safe mode will be used. If an empty condition cannot be tolerated, a low fail-safe mode is required. As a result, filling and draining of the tank will be controlled in either mode. A computer program in microprocessor 20 is used to detect when system 10 is in a fail-safe mode and responds accordingly.

Figure 5B:
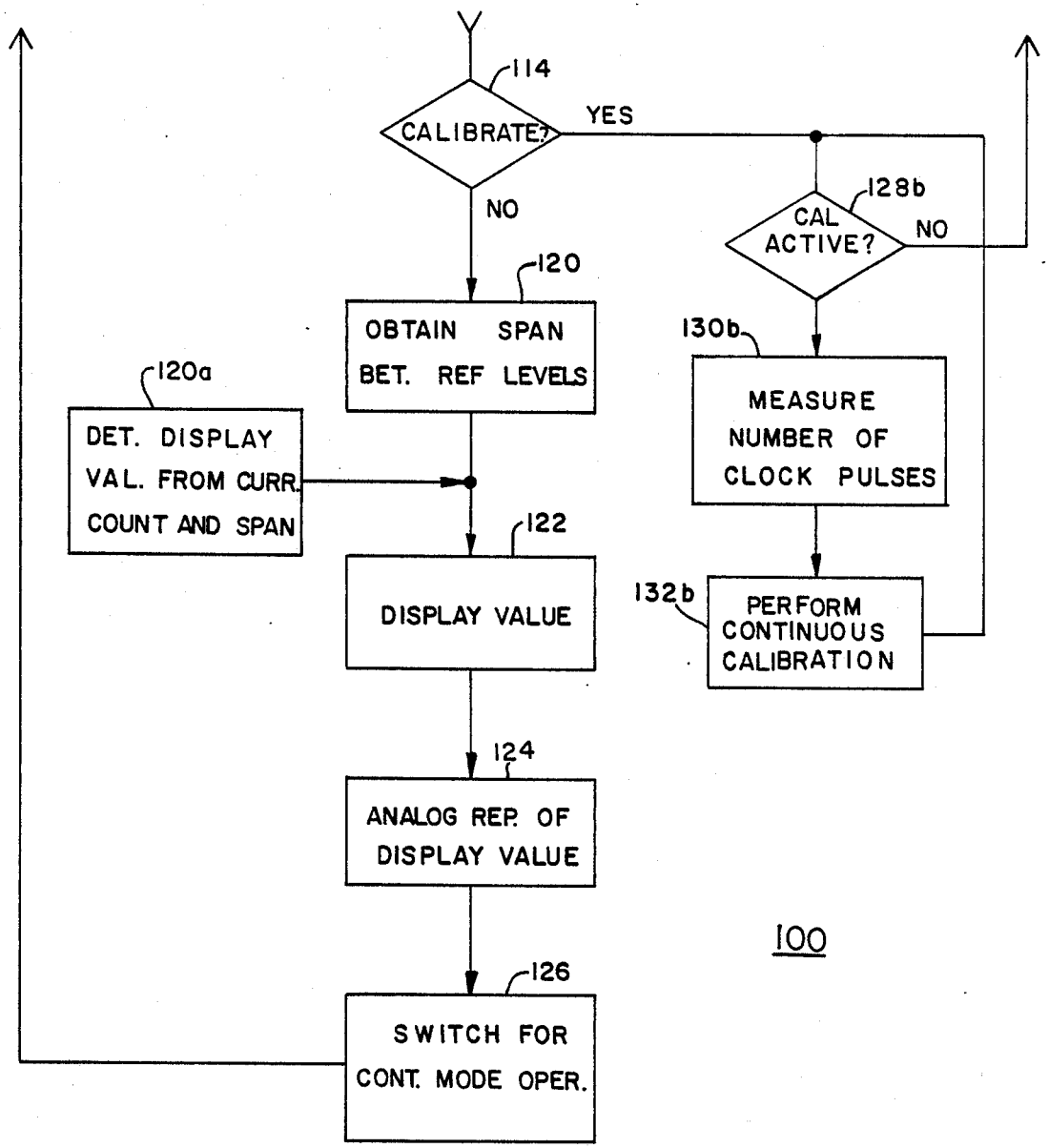

The functions of the program are basically shown in flow chart 100 of FIGS. 5A–B. Flow chart 100 describes the sequence of events that occur during the execution of the program a copy of which is enclosed and made a part hereof written in machine language for the 1802 microprocessor. The program first initialized memory locations by defining them and providing them with initial values. This is performed at the program initialization step 102. The program must first determine what mode it is operating in and this is examined at decision diamond 104.

There are a number of mode selections that can be made in the on/off mode but the outcome is fundamentally the same for all possible selections. Decision diamond 106 first requires a determination as to whether calibration must be performed. If calibration is not required, then the new input value will be compared to the prior set point values for determining whether system 10 should be on or off. This occurs at block 108. In block 110 the program will determine the high and low set point values depending upon the mode selection made. The level status of the present input valve will be made with relation to those high and low set point values. At block 112 the fail-safe switches are examined to determine the proper settings for each switch. The program then returns to the program initialization block 102. If one of the possible selections was made that brings the program into the continuous mode at decision diamond 104, then another sequence of events will occur.

In decision diamond 114 a determination of whether or not to calibrate will be made. If calibration is not required, then block 120 shows that the span between the high and low levels will be determined. In block 120a there is a determination of the display value from the current count and span. Then block 122 display value will be displayed after using a lookup table to obtain the scale. The analog representation of the display value is provided in block 124. The high and low set point values can now be switched into computer memory 42 for further continuous mode operation. Switching the low and high set point values in the computer memory takes place at block 126. Branching now occurs from this point in the program back to the first step of the sequence provided in block 108.

If calibration is required in either the on/off mode or the continuous mode, the sequence of events are essentially identical. First, a decision is made at decision diamonds 128a and 128b to determine if calibration can continue. If calibration continues then a time interval signal will be produced that is proportional to the capacitance between probe 12 and container 26. The time interval signal which is a function of the total number of oscillator pulses within the duration of the signals provided by multivibrator 14, is obtained by the program 20 as indicated by blocks 130a and 130b. With this data the program continues to perform either on/off calibration routines or continuous calibration routines at blocks 132a and 132b respectively. These calibration routines are continued until branching occurs to other portions of the program.

A test mode may also be selected that allows the program to test display 60 and other analog outputs and sensors as shown in block 134. As shown in block 136, if a sensor fails, for example display 60 shows a zero which suggests an empty container and analog outputs are provided at 4 milliamps which is the lowest value of a 4–20 milliamp range. Display 60 shows the same information when calibration fails to occur but a light is also provided for this condition. This is performed in the program as shown in block 136 of the flow chart.

Display device 60 may be used to accept a digital signal along line 59 within a range of from 0 to 100%, for example, to show the analog representation of the fullness of the tank in terms of percent fullness based on the range of the scale provided in extrapolator 46.

Once the probe and transmitter are installed in a tank and the two high/low set points stored in computer memory, the level control system will operate without further probe adjustment. This is especially important when the probe and transmitter are used in explosion proof installations. The probe/transmitter is, itself, explosion proof due, primarily, to its low energy use. Calibrations are required as the system is moved from one shaped tank to a different shaped tank although not when reusing the same tank.

$A000,    MACHINE LANGUAGE CODE FOR 1802 RCA MICROPROCESSOR

```
F8 20 B1 F8 07 A1 F8 07 B2 F8 E2 A2 F8 07 B3 F8

F2 A3 F8 20 B6 F8 0A A6 E6 69 E1 FA 0F C2 10 00

FB 0F C2 03 76 FA 08 CA 01 2A 06 FB FF A5 D2 04

38 C3 03 CB D2 06 D1 85 FE 33 EC FA 0E FF 02 32

7B FF 02 FC 6F A6 F8 00 7C 00 B6 9E B7 8E A7 D2

05 6A C3 03 D0 97 FE C3 03 D0 F8 0B A6 F8 20 B6

97 56 16 87 56 16 17 97 56 16 87 56 16 30 8D 00

00 00 0A 00 1E 00 50 FF F6 FF E2 F8 0B A6 F8 20
```

$A080,

B6 9D 56 16 8D 56 16 9E 56 16 8E 56 16 9F B7 56
16 8F A7 56 16 17 97 56 16 87 56 D2 07 09 D2 06
D1 F8 08 A6 F8 20 B6 06 B5 FA 02 FB 02 FC 0F A6
F8 00 7C 20 B6 D2 06 F6 95 7E B5 C4 C4 D2 07 09
95 FA 02 FB 02 FC 0B A6 F8 00 7C 20 B6 D2 06 F6
C4 C4 95 7E FA 03 B5 F8 20 B6 F8 08 A6 95 56 16
56 85 F6 F6 F6 F6 E6 F3 56 62 30 00 E0 69 FE 33
00 62 08 37 F8 C0 01 07 62 00 E1 D2 04 38 C3 03

$A100,

CB 97 BF 87 AF 30 27 3C 18 62 00 E1 D2 04 38 C3
03 CB 97 BE 87 AE 30 27 3E 27 62 00 E1 D2 04 38
C3 03 CB 97 BD 87 AD C0 00 00 46 FE CB 02 A4 D2
04 38 C3 03 CB E6 97 56 16 87 56 16 88 56 8F F5
73 8D 75 73 9D 75 56 C4 16 16 16 9E 56 16 8E 56
16 9F 56 8F F5 56 26 8D 75 56 26 9D 75 56 E6 26
26 26 F0 FE F3 FE 30 F9 30 F9 60 60 F0 FE 73 F0
7E 73 F0 7E 73 F0 FE 73 F0 7E 73 F0 7E 56 30 62

$A180,

E1 06 26 56 16 16 06 26 56 16 99 56 16 89 56 26
9A B7 8A A7 D2 04 F6 D2 05 14 20 0B F8 20 B6 F8
0D A6 D2 05 B7 C3 03 D0 D2 05 66 20 0F F8 00 A6
F8 10 B6 06 FB FF 32 DF 97 FE 3B C2 F8 00 B7 A7
30 CC FA F8 32 CC F8 FF A7 F8 03 B7 87 FE A7 97
7E B7 D2 05 80 10 00 97 B6 87 A6 46 B7 06 A7 D2
06 D1 D2 07 8E 20 13 05 C3 03 D0 D2 04 42 20 13
D2 07 09 D2 06 D1 C0 02 0D 60 60 60 33 80 F0 FE $A200,

F3 FE C3 01 90 C0 01 6A C4 C4 C4 C4 C4 D2 05 89

20 0B 9B 56 16 8B 56 26 9C B7 8C A7 D2 04 F6 D2

05 89 20 0F D2 06 E4 20 0B D2 04 F6 D2 05 89 20

0D F8 E8 A7 F8 03 B7 D2 05 14 20 0D F8 0F A6 F8

20 B6 D2 05 B7 D2 04 A4 D2 04 6E 20 18 20 13 01

D2 07 23 20 13 05 D2 05 89 20 0D D2 04 6E 20 1C 20 13 01 D2 07 23 20 13 05 D2 05 89 20 0B D2 04

6E 20 18 20 13 00 D2 07 23 20 13 05 D2 05 89 20

$A280,

11 D2 04 6E 20 1C 20 13 00 D2 07 23 20 13 05 D2

05 89 20 0F F8 20 B6 F8 0A A6 06 FB FF A5 C0 00

9B C0 02 0D E0 69 FE C3 00 00 62 08 36 B3 3C A4

C0 03 15 3E A4 62 00 E1 D2 04 38 C3 03 CB 97 BD

87 AD 88 AF F8 00 B9 A9 BB AB F8 0A A6 F8 20 B6

06 FA 01 CA 03 03 D2 04 6E 20 1C 20 13 01 C4 C4

C4 C4 C4 C4 C4 D2 07 23 20 13 05 97 B9 87 A9 D2

04 6E 20 1C 20 13 00 C4 C4 D2 07 23 20 13 05 97

$A300,

BB 87 AB 99 B7 89 A7 D2 07 8E 20 13 05 D2 04 42

20 13 C0 02 A4 3C 12 62 00 E1 D2 04 38 33 CB 97

BE 87 AE 88 BF F8 03 BA BC F8 E8 AA AC F8 0A A6

F8 20 B6 06 FA 01 3A 65 D2 04 6E 20 18 20 13 01

C4 C4 C4 C4 C4 C4 C4 D2 07 23 20 13 05 97 BA 87

AA D2 04 6E 20 18 20 13 00 C4 C4 D2 07 23 20 13

05 97 BC 87 AC 9A B7 8A A7 D2 07 8E 20 13 05 D2

04 42 20 13 30 12 06 FE 3B A5 D2 04 6E 20 18 20

$A380, 13 01 D2 04 42 20 13 D2 04 6E 20 18 20 13 00 D2
07 23 20 13 05 D2 04 A4 30 B8 23 20 13 05 D2 04
A4 30 B8 00 0A D2 04 38 C4 C4 C4 C4 C4 D2 07 8E
20 13 05 D2 04 42 20 13 F8 20 B6 F8 0A A6 46 F6
F6 F6 F6 F9 0C 56 E6 62 C0 00 00 E0 62 04 30 D3
E0 62 08 F8 00 B7 A7 D2 04 A4 F8 00 B7 A7 D2 07
8E 20 13 05 D2 04 42 20 13 C0 00 00 3D FE C4 C4
C4 3D FE C4 C4 C4 3D FE 17 97 FE 3B EC D3 7B F8

$A400,

00 B7 A7 7A 3D 0A F8 80 FE D3 35 1F C4 C4 C4 35
1F C4 C4 C4 35 1F 18 98 FE 3B 0A F8 80 FE D3 6C
3D 32 FE 3B 1F 6C 3D 32 FE 33 25 17 97 FE 6C 3B
22 D3 6C A8 F8 00 FE D3 F8 00 B7 A7 B8 A8 E0 C0
03 EC 44 B6 44 A6 E6 72 FB 0D 3A 4F F8 0A 56 72
3A 54 F8 0F B5 72 A5 72 B8 F0 A8 95 73 85 73 98
73 88 56 61 61 61 61 D3 61 61 61 61 E1 D3 44 B5
44 A5 E5 44 B6 44 A6 44 A8 F8 0B 56 16 86 FF 18

$A480, 32 95 6A 15 FB FF B8 88 32 90 98 F6 F6 F6 F6 B8
98 FA 0F 30 7B E1 D3 15 87 F6 F6 F6 F6 55 15 87
FA 0F 55 D3 97 FE 3B AE F8 00 B7 A7 30 B7 FA F8
32 B7 D2 06 ED 03 FF D2 05 89 20 13 D2 06 ED 00
40 26 26 D2 05 18 D2 05 89 20 13 26 26 E6 64 64
E1 D3 84 A6 94 B6 14 14 30 DE 44 B6 44 A6 E6 97
F3 51 16 87 F5 A7 26 97 75 B7 01 FE 3B F1 97 F3
FE D3 44 B6 44 A6 E6 97 F6 51 97 F3 FA 80 E1 F4

$A500, 51 16 E6 87 F7 A7 26 97 77 B7 E1 F0 FE 3B 13 51
97 F3 FE D3 44 B6 44 A6 E6 97 F3 FA 80 B5 F8 10
A5 F8 00 B8 A8 25 97 F6 B7 87 76 A7 98 3B 3B 16
85 3A 3E 88 F7 A8 26 98 77 B8 95 FE 30 48 88 F4
A8 26 98 74 B8 CF F0 FE 98 76 B8 88 76 A8 3B 54
97 F9 80 B7 85 3A 25 97 FE 88 C7 FB FF 3A 63 98
C7 FB FF FC FF D3 44 B6 44 A6 E6 97 F3 FB 80 51
16 87 F4 A7 26 97 74 B7 01 FE 3B 7F 97 F3 FE D3

$A580,

84 A6 94 B6 14 14 C0 05 6A 44 B6 44 A6 97 56 16
87 56 16 D3 14 14 D3 97 FE 97 3A 94 87 32 96 30
94 44 B6 44 A6 E6 97 FE F8 00 C7 F8 FF B8 A8 46
F1 26 FD 00 3B B7 D3 98 B5 88 A5 FE A8 98 7E B8
97 FE 33 CD 85 3A CE 95 FB 40 32 D7 38 18 95 FA
C0 FD 00 FE C3 06 56 95 E6 F3 FE 16 88 33 E6 F7
A8 26 98 77 30 EB F4 A8 26 98 74 B8 95 FE CB 05
FA 98 FB FF B8 88 FB FF A8 18 98 C2 06 03 FE 33

$A600, 5B 30 54 88 FC FE 33 56 FB FF 3A 39 95 FA 80 32
54 F4 33 56 16 87 F4 A8 26 97 74 B8 16 F0 F6 26
98 C7 FC 80 B8 FE 95 FA 80 3A 2F 3B 54 30 5B 33
56 98 3A 5B 88 32 54 30 5B 95 F3 FE 33 14 95 FE
3B 54 16 F0 26 F6 87 3A 5B 97 33 50 32 54 30 5B
FB 80 3A 5B FF 00 95 B8 85 A8 D3 95 B8 85 A8 98
FE F8 90 C7 F8 50 A5 88 FE A8 98 7E B8 87 FE A7
97 7E B7 3B 76 18 E6 85 F3 FE 16 88 3B 85 F7 A8

$A680, 26 98 77 30 8A F4 A8 26 98 74 B8 25 85 FA 7F 3B 94 17 F9 80 A5 FA 3F 3A 67 33 B0 38 17 F3 FE 16

88 33 AA F4 A8 26 98 74 30 AF F7 A8 26 98 77 B8

98 3A B6 88 32 C1 85 FE FE 98 CF FB 80 FC 80 3B

9C F0 FE 3B D0 87 FB FF A7 97 FB FF B7 17 FC 00

D3 91 B6 81 A6 16 16 E1 06 73 26 06 73 97 56 87

16 56 26 D3 44 B6 44 A6 46 B7 46 A7 D3 44 B7 44

A7 D3 44 B6 44 A6 E6 97 F3 FA 80 CA 07 07 97 F7

$A700, 3A 08 16 87 F7 26 38 F4 D3 FF 00 C8 FC 00 11 91

B6 81 A6 16 16 3B 1C 46 B7 06 A7 26 41 56 16 01

56 16 D3 44 B5 44 A5 44 FF 01 A8 F8 00 A7 B7 05

FB 0D B8 15 E1 05 FA 0F 51 87 F4 A7 97 7C 00 B7

33 73 28 88 32 74 87 FE 73 97 7E 73 33 71 F8 02

51 87 FE A7 97 7E B7 33 71 01 32 60 FF 01 30 50

11 97 F4 B7 33 72 11 87 F4 A7 97 7C 00 B7 3B 33

C8 11 11 D3 97 FC 80 3A 80 87 3A 80 98 FC FF D3

$A780, 33 7F 98 3A 8D 87 FD 00 A7 97 7D 00 B7 D3 44 B5

44 A5 44 FF 01 A8 B8 F8 0F A6 97 FE F8 0B 3B AD

87 FD 00 A7 97 7D 00 B7 F8 0D C8 F8 00 55 88 32

B6 15 28 30 AB E1 98 A8 87 FE A7 97 7E B7 05 7C 00 55 86 3A C6 D3 05 7E 55 FF 0A 3B CE 55 25 28

88 3A C6 33 C5 26 98 51 85 F4 A5 95 7C 00 B5 30

B6 D0 E1 94 73 84 73 90 B4 80 A4 44 B0 44 A0 30

E1 D0 94 B0 84 A0 E1 11 72 A4 F0 B4 30 F1 00 00

What is claimed is:

1. An on-line level indicator system having memory for automatically measuring an unknown present substance level within a container as a function of a capacitance between the container and a capacitance probe positioned within the container, comprising:

time interval means connected to the capacitance probe for providing and storing in memory, level time interval signals representative of selected actual low and high substance levels of the container, comprising:
means coupled to said capacitance probe for providing a time duration waveform having a time duration proportional to the capacitance between the container and the capacitance probe;
oscillator means for producing oscillator pulses of constant predetermined frequency;
logic means for receiving the time duration waveform and the oscillator pulses and for transmitting the oscillator pulses only during the time duration;
means coupled to the logic means for counting the oscillator pulses transmitted by the logic means; and
means for storing values produced by said counting means in said memory as level time interval signals;
said time interval means including means for reading and storing into memory a time interval signal representative of the unknown present substance level;
calibration means for providing and storing in memory (1) a low level calibration value representative of the selected actual low substance level and (2) a high level calibration value representative of the selected actual high substance level; and
extrapolating means coupled to the memory for calculating, from the low and high level time interval signals, the low and high level calibration values and the unknown actual level time interval signal, an extrapolated output value representative of the unknown present substance level, wherein, the extrapolated unknown present level may be below the selected low level, above the selected high level or between the selected low and high levels.

2. An on-line level indicator system, having memory, for automatically calibrating and measuring an unknown present substance level within a container as a function of a capacitance between the container and a capacitance probe positioned within the container, comprising:

time interval means connected to the capacitance probe for providing and storing in memory level time interval signals representative of selected actual low and high substance levels of the container;
calibration means for providing and storing in memory (1) a low level calibration value representative of the selected actual low substance level and (2) a high level calibration value representative of the selected actual high substance level;
said time interval means including means for reading and storing into memory a time interval signal representative of the unknown present substance level; and
extrapolating means coupled to the memory for extrapolating, from the low and high level time interval signals, the low and high level calibration values, and the unknown actual level time interval signal, an extrapolated output value representative of the unknown present substance level wherein the extrapolated unknown present level may be below the selected low level, above the selected high level or between the selected low and high levels.

3. The on-line level indicator system of claim 2, including fail safe means for selectively preventing filling or draining of the container during system failure, the fail safe means comprising:
detecting means for detecting system failure in response to power failure or interruption of the time interval signal;
means for determining whether overfilling of the container or emptying of the container must be prevented during system failure;
means for simulating an unsafe high substance level in response to determining that overfilling must be prevented thereby preventing further filling of the container; and
means for simulating an unsafe low substance level in response to determining that emptying must be prevented thereby preventing further draining of the container.

4. The on-line level indicator system of claim 2 wherein the extrapolating means further comprises:
means for calculating a first difference between the present level time interval signal and the two level time interval signal;
means for determining a second difference between the high level time interval signal and the low level time interval signal;
means for dividing the first difference by the second difference thereby providing the proportional relationship;
means for determining a third difference between the high and low substance levels; and
means for multiplying the proportional relationship by the third difference thereby producing the signal representative of the unknown present substance level of the container.

5. The on-line level indicator system of claim 4 in which the extrapolating means includes means for calculating the substance level in a range from 0 to 100% of fullness of the container.

6. The on-line level indicator system of claim 5 in which the extrapolating means includes means for nonlinear conversion of the percent of fullness of the container to units of volume when the container has a known irregular shape.

7. A method of determining an unknown present substance level within a container as a function of a capacitance between the container and a capacitance probe positioned within the container, comprising the steps of:
filling the container with a substance to an actual low substance level;
storing, in a memory, a low level calibration value representative of the actual low substance level;
applying a charging current to the capacitance;
measuring a low level time interval, being the amount of time needed to charge the capacitance to a predetermined potential;
storing the low level time interval in a memory;
filling the container with the substance to an actual high substance level;

storing, in a memory, a high level calibration value representative of the actual high substance level;
applying a charging current to the capacitance;
measuring a high level time interval, being an amount of time needed to charge the capacitance to the predetermined potential;
storing the high level time interval in a memory;
filling the container with the substance to the unknown present substance level;
applying a charging current to the capacitance;
measuring an unknown level time interval, being an amount of time needed to charge the capacitance to the predetermined potential;
calculating, from the low and high level calibration values, the low and high level time intervals and the unknown level time interval, the unknown present substance level, where the unknown present substance level may be below the actual low substance level, above the actual high substance level or between the actual low and high substance levels.

* * * * *